CONDUIT SYSTEM AND COMPONENTS THEREFOR

Filed May 11, 1960 5 Sheets-Sheet 1

INVENTORS
WILLIAM W WITORT,
JAMES W. HUDSON AND
EDWARD J. KING by John D. Dewey
ATTORNEY.

CONDUIT SYSTEM AND COMPONENTS THEREFOR

INVENTORS
WILLIAM W. WITORT,
JAMES W. HUDSON AND
EDWARD J. KING.

by John D. Dewey
ATTORNEY.

Nov. 12, 1963 W. W. WITORT ETAL 3,110,754

CONDUIT SYSTEM AND COMPONENTS THEREFOR

Filed May 11, 1960 5 Sheets-Sheet 3

INVENTORS
WILLIAM W. WITORT,
JAMES W. HUDSON
AND EDWARD J. KING.
by John D. Dewey.
ATTORNEY

CONDUIT SYSTEM AND COMPONENTS THEREFOR

INVENTORS
WILLIAM W. WITORT,
JAMES W. HUDSON AND
EDWARD J. KING
BY John D. Dewey
ATTORNEY.

Nov. 12, 1963 W. W. WITORT ETAL 3,110,754

CONDUIT SYSTEM AND COMPONENTS THEREFOR

Filed May 11, 1960 5 Sheets-Sheet 5

INVENTORS
WILLIAM W. WITORT,
JAMES W. HUDSON AND
EDWARD J. KING
BY John D. Dewey
ATTORNEY.

3,110,754

CONDUIT SYSTEM AND COMPONENTS THEREFOR

William W. Witort, 1480 N. Milwaukee, Libertyville, Ill.; James W. Hudson, 410 E. Schiller, Elmhurst, Ill.; and Edward J. King, 1923 S. Kensington, Westchester, Ill.

Filed May 11, 1960, Ser. No. 28,495
6 Claims. (Cl. 174—70)

The present invention relates to conduit systems for the delivery of material, such as solids, fluids, etc. More specifically, the invention is directed to a conduit system and components thereof in the form of pipe-like conduit, connectors, and junction-outlet boxes.

As is commonly practiced, living unit building structures are wired through flexible pipe-like conduit systems solely with regard to electrical wiring distribution. Additional wiring systems for use with telephone, intercom, television, etc., normally constitute separate installations requiring in many instances duplicated conduit systems or concealed and/or exposed wiring. With regard to advance wiring of living unit structures, the expense involved in the installation of duplicated wiring systems for various uses is virtually prohibitive. Furthermore, as by way of example with regard to telephone advance wiring, coordination of a separate telephone wiring crew with other sub-contractors is impractical and often impossible. Still referring specifically to telphone wiring, the telephone companies obviously have had a problem in providing adequate wiring in new homes, apartment houses, hotels, motels, and other living unit structures. Attempts have been made to promote advanced wiring in such structures to partially offset the difficulties of post-wiring and constant rearrangement of telephone outlets to satisfy customer demands for convenient telephone location.

It is an object of the present invention to provide a new and improved conduit system and components therefor which independently and cooperatively permit diverse material handling and distribution in a single system.

Still a further object is to provide a new and improved conduit system and components therefor, the system being particularly adapted to distribute in a totally separated manner two completely different wiring systems, such as electrical and telephone.

Another object is to provide a new and improved conduit for material delivery, the conduit being formed from readily bendable material and being provided with at least a pair of separate passageways, each passageway being separate and distinct from the other throughout the entire length of the conduit.

Still another object is to provide a conduit of the type described in the foregoing object, the conduit having located therein a partition means subdividing the interior of the conduit into a plurality of separate and longitudinally continuous sub-passageways.

A further object is to provide a new and improved junction-outlet box for use in the conduit systems and with the special conduit of the present invention, the box including partition means which cooperatively function with an internally subdivided conduit to maintain complete separation of diverse material delivered thereinto through the conduit.

A further object is to provid a junction-outlet box of the type described in the foregoing object which is adapted for use as a dual outlet means capable of supplying wiring connections for the operation of completely diverse units such as lighting fixtures and telephones.

An additional object is to provide a new and improved junction or outlet box for use in dispensing completely separate wiring systems as described in certain of the foregoing objects, the box being formed to a certain extent from standard-type components but including new and improved elements specially adapting the same for its intended use.

Still a further object is to provide new and improved coupling and connector arrangements for the inter-connection of subdivided conduit including that of the type described above, and for use in inter-connecting this same conduit with partitioned junction or outlet boxes also of the type described above, the coupling and connector arrangements functioning to maintain material delivery separation in a new and novel manner.

An additional object is to provide a special coupling insert adapted for use with partitioned conduit and standard-type couplers, the insert cooperatively functioning with the conduit and coupler to maintain material separation.

A further object is to provide a new and improved connector insert particularly adapted for use with subdivided conduit, partitioned junction or outlet boxes and a standard-type connector used in connecting the conduit to a box, the insert cooperatively functioning with the elements named to maintain separation of material delivered by the conduit through the connector into or out of the box.

Other objects not specifically set forth will become apparent from the following detailed description of the present invention made in conjunction with the accompanying drawings wherein.

The conduit system and components thereof make use of the principle of providing completely separated passageways and areas through and into which segregated materials, such as separate wiring systems or circuits, are fed. The conduit is formed from readily bendable material, such as aluminum, and is designed to provide at least a part of completely separate, fully enclosed passageways through which individual wiring systems requiring segregation are fed. The junction or outlet box includes a sectionalized interior specially arranged to receive wire dispensed from the conduit for further feeding or terminal use while maintaining prescribed separation thereof. For suitable inter-coupling of conduit and connecting of conduit to the box, special inserts are utilized between coupled conduit and conduit-box connection to again maintain service separation.

Figure 1:
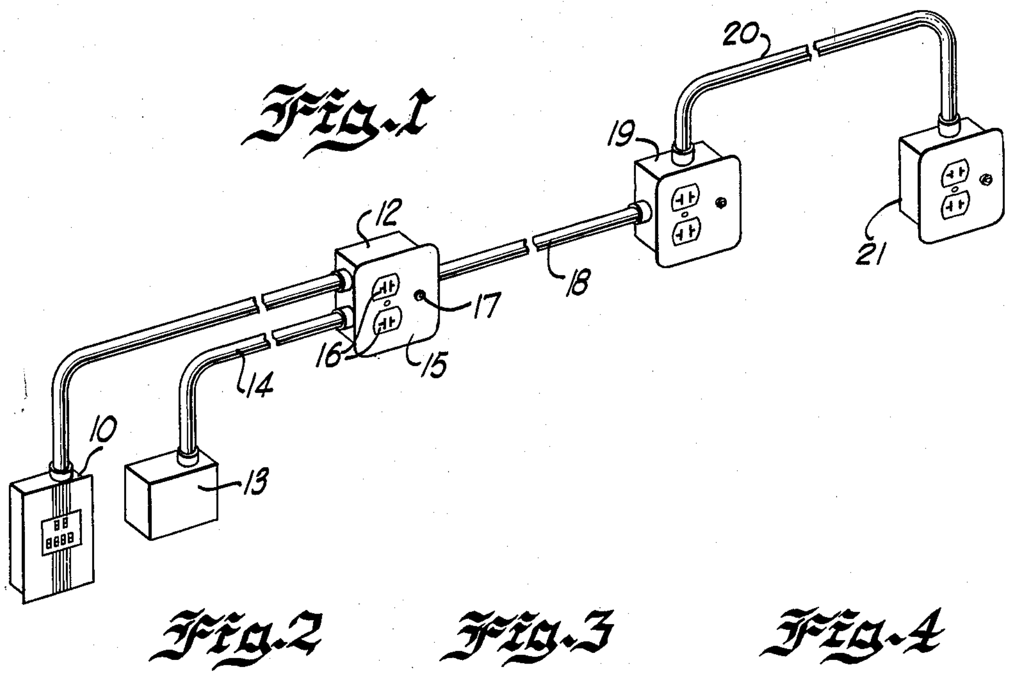
FIG. 1 is a diagrammatic perspective of a dual wiring system incorporating therein the basic principles and certain system components of the present invention.

FIG. 1 illustrates an adaptation of the new and improved conduit system and components thereof to a living unit wire distribution system for basic use in homes, apartment buildings, hotels, motels, etc. This system includes a power inlet box 10 located in a basement or the like and into which electrical service is delivered. A known type of single passageway conduit 11 suitably connected to the box 10 extends upwardly from the basement to a first floor outlet box 12 of the type constituting a part of the present invention. A separate telephone service box 13 is mounted in the basement and receives suitable telephone wiring from the exterior of the dwelling. A standard type of single passage conduit 14 is suitably connected to the box 13 and delivers telephone wiring to the special outlet box 12 on the first floor of the dwelling. The box 12 includes a standard face plate 15 through which is available a duplex receptacle 16 and which also carries a bushing protected opening 17 for phone connection, this portion of the box possibly being in the form of a plug-receiving phone jack.

Extending from any selected side of the box 12 is a special multiple passageway conduit 18 forming a part of the present invention and designed to carry separate service wiring in a completely segregated and isolated manner. The conduit 18 distributes both electrical service and telephone service therethrough to another box 19 which is of the same design and arrangement as the box 12. The box 19 may be located on the first floor of the dwelling in suitably spaced relation to the box 12 along the baseboard of the wall of a room. Extending from the box 19 is a conduit 20 of the same design as the conduit 18, namely, carrying segregated, separate wiring services. The conduit 20 extends to another box 21 which again is of the same design and function as the boxes 12 and 19, the box 21 being located in any desired area in the house, such as on the top floor or the like.

From the foregoing it should be apparent that the system and components used provide for unitary but segregated distribution of separate wiring systems throughout a dwelling to and from any convenient location. Where telephone is combined with electrical service in such a system, telephone wiring connections are available for telephone installation to exactly the same extent as electrical outlet service is available. With this system an electrical contractor by installing a single conduit and multiple box system in the usual manner provides means for protectively distributing two distinctly different wiring services through a dwelling. Installation is accomplished without additional cost and the dwelling may be completely wired in advance with all wires protectively concealed. A telephone company can at relatively low cost completely wire its portion of the system and thus make available to the new subscriber a substantial number of convenient locations for phone installation.

Figure 2:
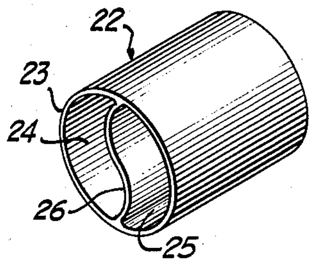
FIG. 2 is a fragmentary end face perspective of one form of conduit of the present invention.

In making the type of system described above possible, a special form of conduit (conduits 18 and 20) is used, such conduit constituting a part of the present invention. FIG. 2 illustrates a conduit 22 which includes a standard cylindrical shell 23 formed from readily bendable material, such as aluminum, the interior of the shell 23 being subdivided into two separate passageways 24 and 25 by an S-shaped partition 26 which bisects the interior. The shape of the partition is important so as to provide adequate material to accommodate bending in any direction. The partition 26 may be formed integrally with the shell 23, as by extrusion of the conduit 22 with the partition 26 intact, or the partition 26 may be formed from suitable bendable material which is inserted in a preformed shell 23. In this regard, the shell 23 and partition 26 may be formed from suitable plastic materials providing such materials exhibit adequate physical and chemical properties to handle the diverse materials, such as wiring, distributed thereby.

Figure 3:
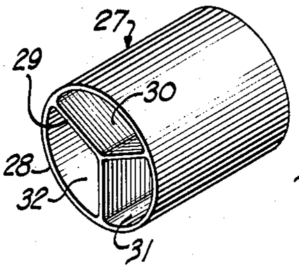
FIGS. 3–7 are views similar to FIG 2 each illustrating a different form of conduit.
Figure 4:
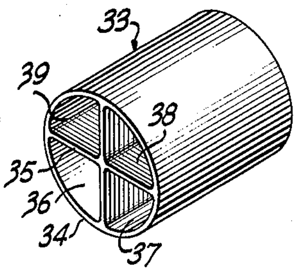
Figure 5:
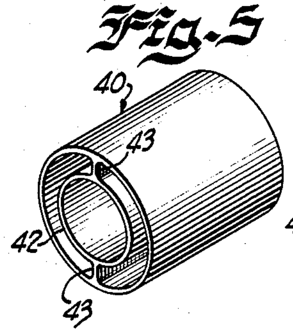

FIG. 3 illustrates a modified conduit 27 formed from a cylindrical shell 28 and internally provided with a three section partition 29 subdividing the interior of the shell 28 into three separate passageways 30, 31 and 32. FIG. 4 illustrates a conduit 33 whose shell 34 has formed internally thereof a quadrant type partition 35 subdividing the same into four passageways 36, 37, 38 and 39. FIG. 5 deals with a conduit 40 having concentrically received within the outer shell 41 an inner cylindrical shell 42 fixed therein by a pair of supporting web-like wall segments 43. The inner shell 42 is uninterrupted longitudinally thereof to provide for a complete separation between material received therein and thereabout. The wall segments 43 may be longitudinally uninterrupted to thus divide the area about the inner shell 42 into separate passageways. However, if more area is needed for a single material externally of the inner shell 42, the wall segments 43 may be interrupted.

Figure 6:
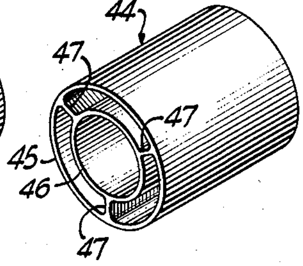
Figure 7:
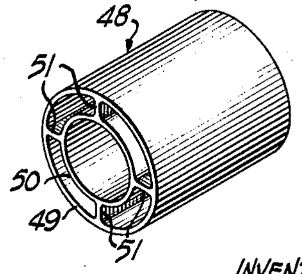

A further form of conduit 44 shown in FIG. 6 includes an outer shell 45 and a concentric inner shell 46. The inner shell is supported by three wall segments 47 which may be of the type described in connection with the conduit 40 of FIG. 5. FIG. 7 is a further modification of FIGS. 5 and 6 illustrating a conduit 48 having an outer shell 49, inner shell 50 and four wall segments 51. It will be noted that if the wall segments 51 are longitudinally uninterrupted, the area surrounding the inner shell 50 is subdivided into four separate passageways.

Figure 8:
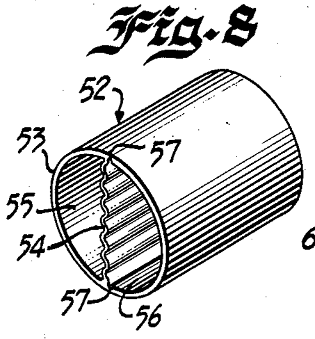
FIG. 8 is a fragmentary perspective of still another modified form of conduit.

The conduit 52 of FIG. 8 is particularly adapted for use in the system of the present invention. This conduit includes an outer shell 53 of normal thickness, i.e. comparable to standard single passageway conduit. The shell 53 has integrally formed therewith a serpentine or corrugated section 54 in the form of a partition extending transversely across the interior thereof. The convolutions of the partition 54 are of sufficiently close spacing to impart to the partition omni-directional flexibility with adequate stability retention to provide for controlled and uniform bending of the partition with the shell 53 while retaining at least substantially the original area of the separate passageways 55 and 56 formed thereby. The partition 54 is preferably completely uninterrupted throughout its entire area. This partition may be centrally located within the shell 53 but also may be offset slightly to one side of the central transverse axis of the shell 53 as illustrated in FIG. 8. The offsetting of the partition 54 permits internal grooving of the inner-surface of the shell 53 to provide longitudinally continuous, inwardly opening grooves or recesses 57. These grooves are oppositely positioned immediately adjacent the junctures of the partition 54 with the shell 53 and are provided to receive therein a coupler or connector insert in the manner to be described.

Figure 9:
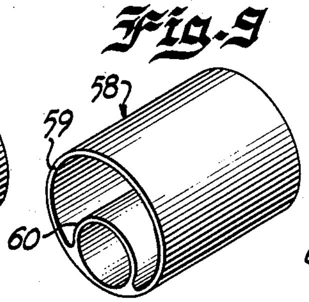
FIGS. 9–12 are views similar to FIG. 8 of additional modifications of conduit design.

FIG. 9 illustrates a conduit 58 formed with a cylindrical shell 59 having an internally located, integrally formed, semi-cylindrical inner shell 60 which, in effect, is tangentially located. This particular design provides for a completely separate internal passageway location arranged to directly receive bending forces transmitted through the outer shell 59 in localized areas. In other words, the inner shell 60 functions much as a separate conduit being readily bendable with that portion of the outer shell 59 with which it is integrally formed over a rather substantial area.

Figure 10:
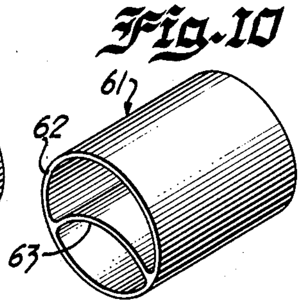

A modification of the design of FIG. 9 is shown in FIG. 10. The conduit 61 of FIG. 10 includes an outer shell 62 having integrally formed therewith internally thereof a semi-circular partition 63. This partition is provided with a radius of curvature equal to the radius of curvature of the outer shell 62. This equal radius design feature provides for concurrent uniform bending of the outer shell 62 and partition 63.

Figures 11, 12, 13, 14:
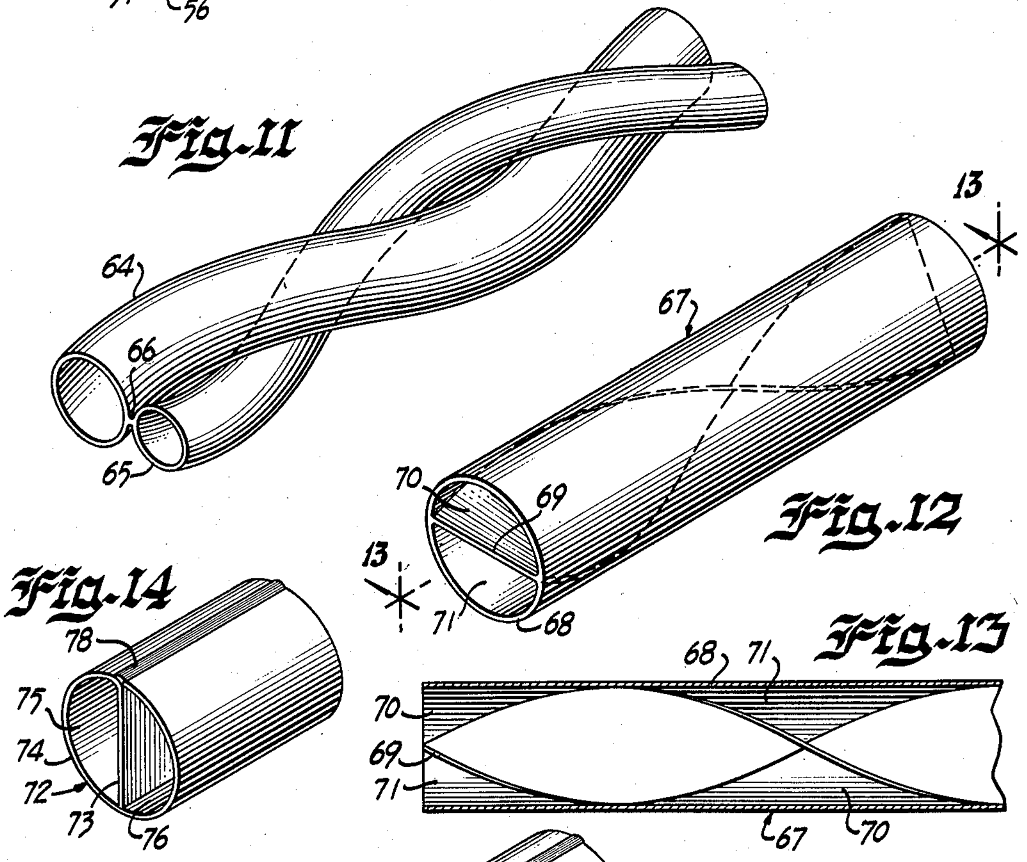
FIG. 13 is a partly sectioned, fragmentary side view of the modified form of conduit shown in FIG. 12.
FIG. 14 is a fragmentary end face perspective of still a further modified form of conduit.

FIG. 11 illustrates a dual conduit design consisting of a first conduit 64 integrally connected with a second conduit 65 by means of a relatively thin, readily breakable bridging membrane 66. The joined conduits 64 and 65 may be mutually twisted about one another as illustrated but are basically designed for unitary functioning during bending and the like. When the dual conduit is connected with a suitable junction or outlet box, the separate conduit portions 64 and 65 may be readily disengaged to any extent desired by rupture of the bridging membrane 66 thus freeing ends of the conduit portions for separate and individual connection to the box.

FIGS. 12 and 13 illustrate a conduit 67 provided with an outer cylindrical shell 68 and having inserted or integrally formed therein a helical partition 69. As best illustrated in FIG. 12, opposite sides of the partition 69 define separate passageways 70 and 71 within the shell 68.

FIG. 14 illustrates an uncomplicated form of rolled conduit 72. This conduit is formed from a single sheet of suitable metal having a flat partition section 73 which is rolled outwardly with an arcuate curvature to define a semi-circular portion 74 which closes at the free edge of the flat portion 73 to define one passageway 75. The arcuate portion 74 continues beyond the edge of the flat portion 73 and is rolled further with a similar arcuate portion 76 which terminates at the juncture of the flat portion 73 and arcuate portion 74 to define a second separate passageway 77. The free edge of the arcuate portion 76 is secured by a continuous weld 78 to completely enclose the conduit.

Figure 15:
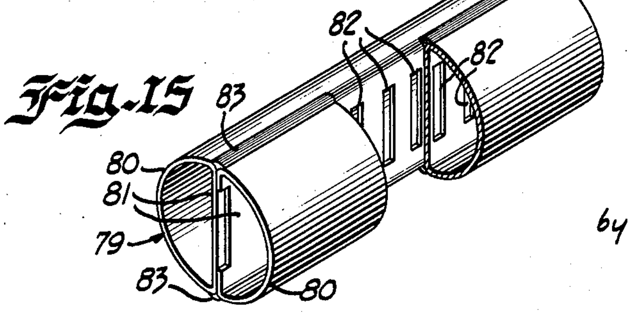
FIG. 15 is a fragmentary end face perspective of another form of conduit.

FIG. 15 illustrates a double D-section conduit 79 formed from identical sections 80. Each section 80 includes a flat portion 81 which is suitably perforated longitudinally therealong to adequately weaken the same for suitable bending. The perforations may be in the form of narrow slots 82 extending transversely of the longitudinal axis of each section. The sections 80 are joined by face-to-face engagement between flat portions 81 and the perforations 82 of the joined portions 81 may be staggered to provide for complete isolation of the passageways defined by each section 80. Joining may be accomplished by any suitable means such as welds 83.

The various forms of conduit described above have one basic concept in common, namely, the provision of a plurality of completely separate coextensive passageways. In most diverse material handling and delivery systems using one or more of the conduits of the present invention, it will be preferred that the plural passageways provided by the conduit each be completely isolated from one another. Under such circumstances all partitions will be longitudinally continuous even though such partitions are integrally formed or are inserts. Certain of the modifications will be found to be particularly adapted for use in distributing separate wiring systems due to design features providing for ease of wire pulling and further due to ease of bending in any direction. Other modifications may be particularly adapted for fluid or granular material handling where ease of bending may not be of prime importance.

With the various forms of conduit described above, special box design becomes important. The separation of two entirely different wiring services must be maintained in an outlet or junction box for service dispensing through suitable receptacles and for further distribution thereof.

Figure 16:
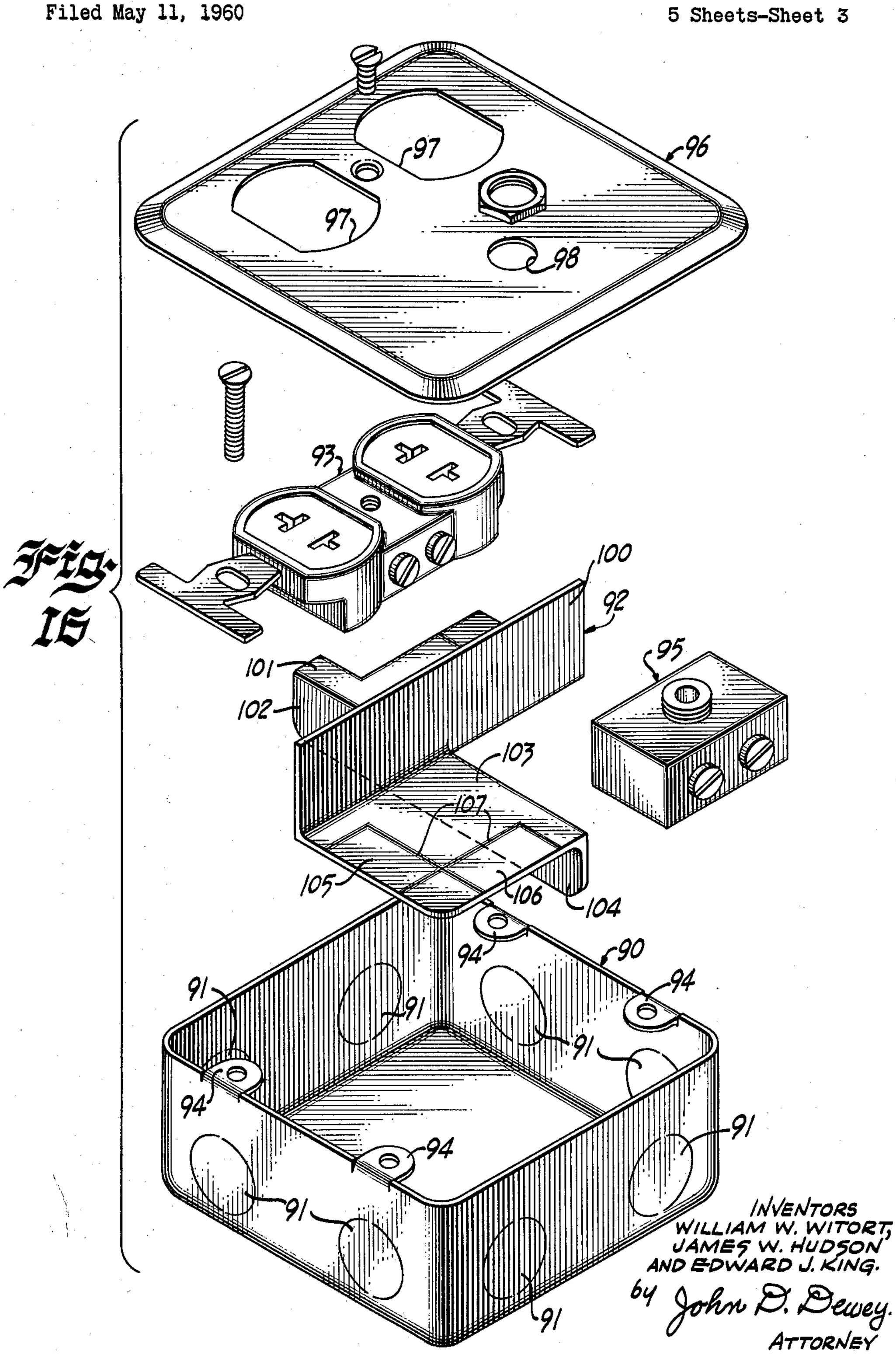
FIG. 16 is an exploded perspective of one form of outlet box constituting a part of the present invention and illustrating the various components used therewith.

FIG. 16 illustrates an outlet box and components therefor, this box being of the same type as the boxes 12, 19 and 21 in FIG. 1. The outlet box includes a square box base or housing 90 which is fully open along one face thereof and which is provided with any number of knock-out disc portions 91 and spaced along the side walls thereof. A special partition member generally designated by the numeral 92 is dimensioned to be received in the box 90 to subdivide the same into a plurality of specially and partially inter-connected chambers in a manner to be described. A duplex receptacle 93 is received in the box 90 in one of the compartments defined by the partition 92, opposite side walls of the box 90 being provided with inwardly directed fastener receiving ears 94 for fixed attachment of the receptacle 93 by suitable screws or the like. The box 90 is illustrated as being used in a system carrying electrical and telephone wiring and, in this respect, also includes a telephone unit 95 for mounting in a different compartment in the box 90 as also defined by the partition 92. A cover or face plate 96 completes the assembly, this plate being of standard design and having a pair of openings 97 through which access is gained to the receptacle 93, and an opening 98 through which is received a bushing portion of the telephone unit 95 into which a telephone cord can extend for connection to the telephone unit 95. The unit 95 is mounted on the plate by a suitable nut illustrated adjacent the plate.

Figures 17, 18, 19:
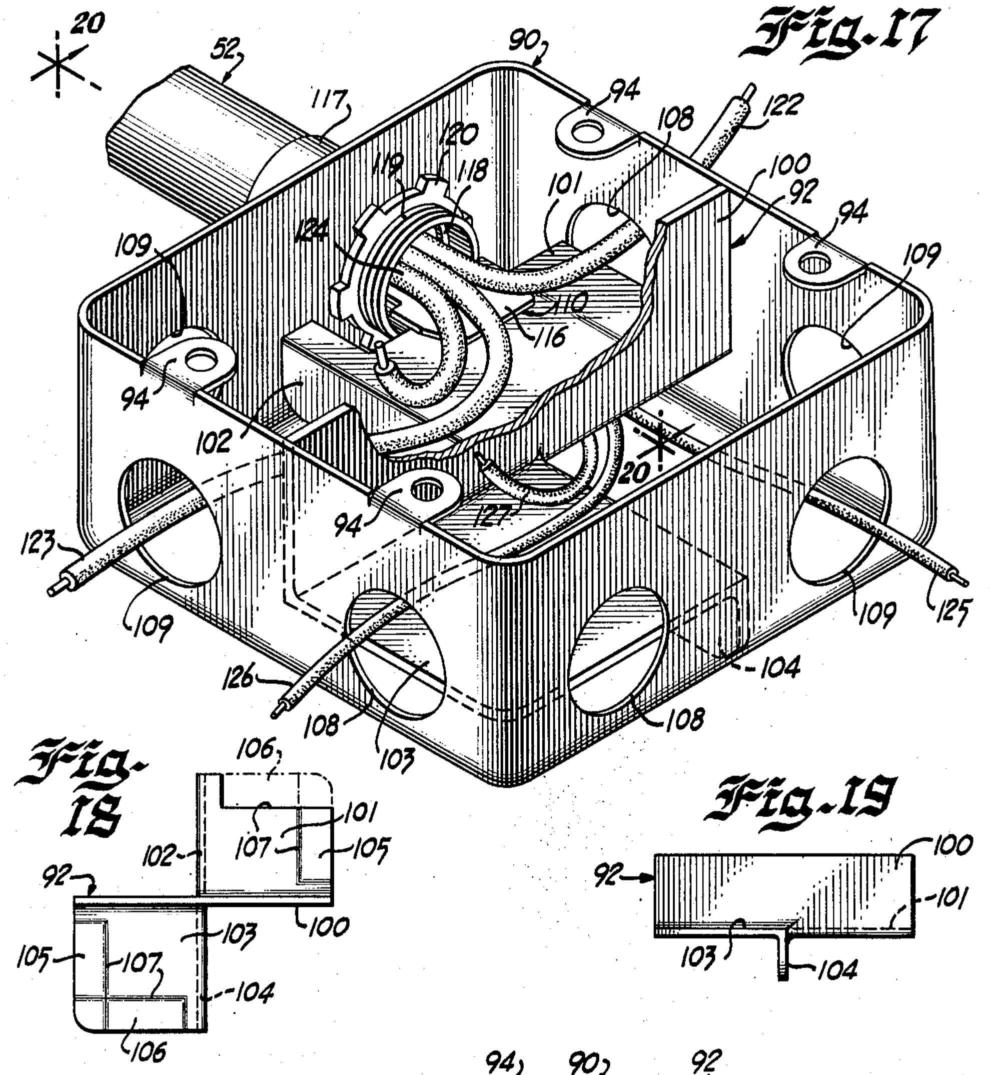
FIG. 17 is a partly diagrammatic, fragmentary perspective view of the box base and partition of FIG. 16 for use in describing certain structural and functional features thereof.
FIG. 18 is a plan view on reduced scale of the partition.
FIG. 19 is a side elevation of the partition.

FIGS. 17–19 illustrate the structural features of the partition 92 and the function thereof. This partition includes a transverse, vertically upwardly directed dividing wall 100 which subdivides the upper half of the box 90. Extending from one-half of the base of the wall 100 to one side thereof is a relatively flat floor section 101 which along the inner edge has integrally formed therewith a depending wall section 102. The wall section 102 along the bottom free edge thereof is in abutment with the back face or floor of the box 90, this wall section being of sufficient height to hold the floor section 101 midway between the top and bottom edges of the adjacent side walls of the box 90. The partition 92 is provided with another flat floor section 103 which is diametrically opposed to the floor section 101, lying in the same horizontal plane therewith, but extending from the opposite side of the remaining bottom edge portion of the dividing wall 100. The floor section 103 is also provided with an integrally formed depending wall section 104 along the inner edge thereof, this wall section constituting a continuation of the wall section 102 and being in engagement with the back face of the box 90 to support the floor section 103 midway between the top and bottom edges of the adjacent side walls of the box.

As best shown in FIG. 18, the outer edges of the floor sections 101 and 103 are formed with weakened rectangular areas 105 and 106, each of which are defined by score lines 107, these sections in effect overlapping one another. The side walls of the box 90 will be provided with conduit connection openings of the type shown in FIG. 17 when the knockout portions 91 (FIG. 16) are removed. The partition 92 with its floor sections 101 and 103 transversely bisect certain openings, such as the openings 108, while leaving the entire area of the remaining openings 109 undivided.

Figure 20:
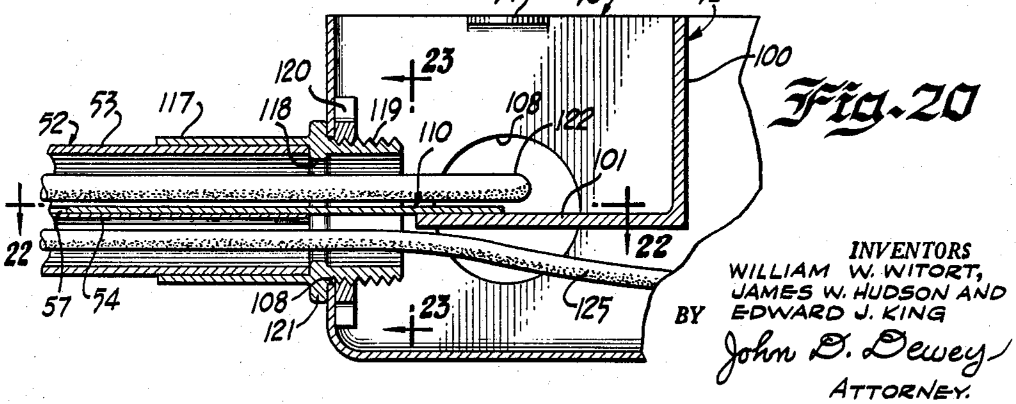
FIG. 20 is a fragmentary section of a conduit-box connection taken generally along line 20—20 of FIG. 17 and illustrating one form of connector insert of the present invention.
Figures 21, 22, 23, 24:
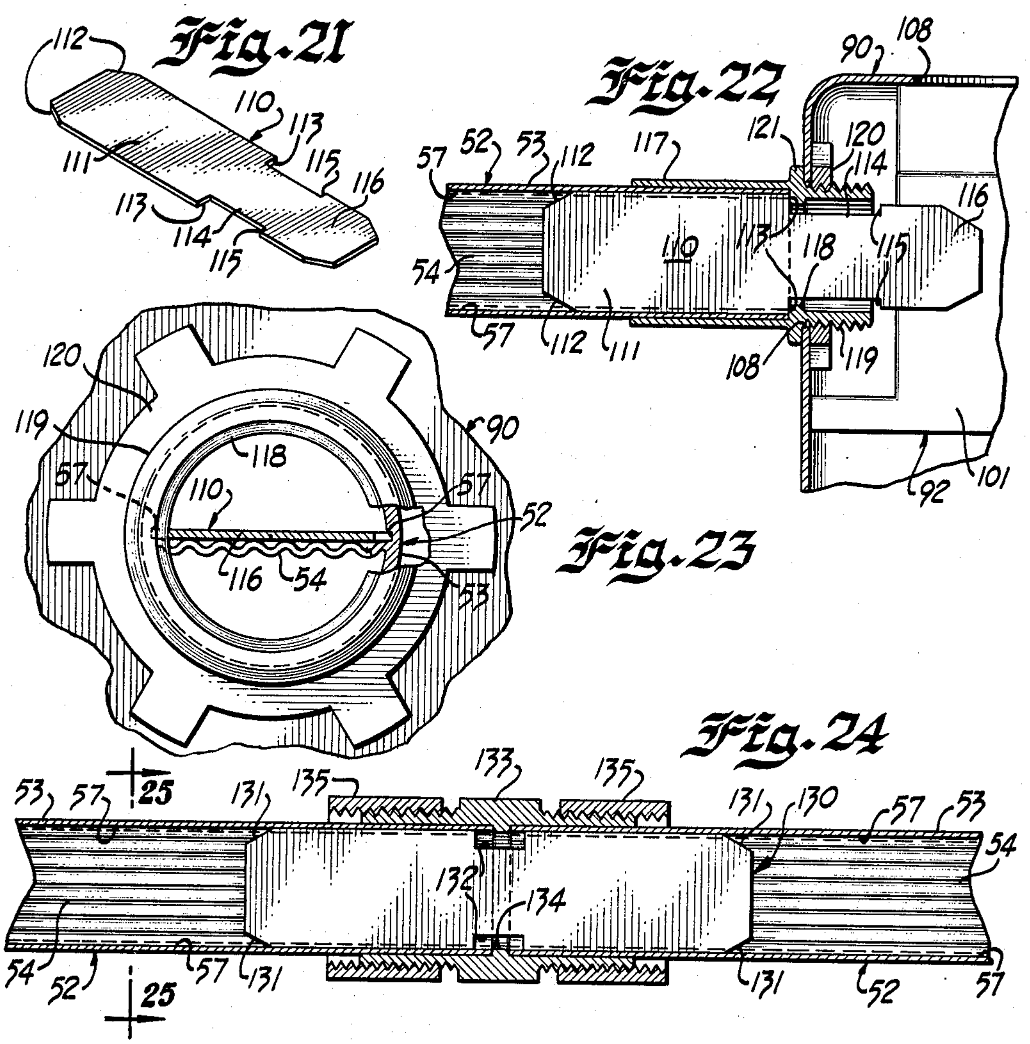
FIG. 21 is a perspective of the connector insert.
FIG. 22 is a fragmentary vertical section of the combined conduit, connector insert and standard-type connector further illustrating operative use thereof.
FIG. 23 is a fragmentary end view of the combined structures of FIG. 22.
FIG. 24 is a fragmentary vertical section of a standard-type coupling, coupled ends of conduit and a coupling insert forming a part of the present invention.

In generally describing the function of the partition 92, FIG. 17 illustrates attachment of a divided conduit 52 of the same type shown in FIG. 8 having a corrugated partition 54 and oppositely positioned grooves 57. The grooves as best shown in FIGS. 20 and 22 receive therein a connector insert 110. This insert as illustrated in FIG. 21 is formed from a piece of flat metal or other suitable material having a relatively wide conduit insertion portion 111 provided with beveled corners 112 to aid insertion, opposite edge shoulders 113 whch are defined by radial grooves 114, these grooves further defining oppositely facing shoulders 115 of reduced radial width, and a box inserting end portion 116 of a width equal to the shoulders 115. The wide portion 111 of the insert 110 slides into the conduit 52 within the grooves 57 thereof to one side of the partition 54. The beveled corners 112 facilitate the insertion. A standard form of crimp connector 117 is received and crimped about the conduit 52 to an extent that the conduit abuts a circumferential rib 118 in the interior of the connector 117. The rib 118 extends radially inwardly to an extent that it overlaps the shoulders 113 of the insert 110 thus holding the insert within the conduit 52. The width of the narrow section 116 of the insert 110 is limited to permit forced sliding of the connector rib 118 thereby and is less than the diameter of one of the apertures 108 of the box 90 to permit ready insertion thereof through the aperture into the interior of the box. A threaded end 119 of the connector 117 is also received through the aperture 108 into the box 90. A lock ring 120 is threadedly advanced on the threaded portion 119 of the connector internally of the box to clamp the wall of the box between the same and a circumferential external rib 121 of the connector. In this manner the conduit 52 is connected to the box 90 and as shown in FIGS. 20 and 22, the insert 110 functions as a continuation of the partition 54 through the connector 117 into overlapping engagement with the floor section 101 of the partition 92 of the box 90. As best shown in FIG. 17, the corner section 106 of the floor section 101 has been removed to provide adequate space for the lock ring 120 and threaded portion 119 of the connector in the interior of the box. However, the two different wiring services initially separated by the partition 57 of the conduit 52 are maintained separate by reason of the insert 110.

FIG. 17 illustrates certain features of wire distribution within the box 90. Merely by way of example, a wire 122 issuing from the top passageway of the conduit 52 onto the top of the floor section 101 may go out of the box through the immediately adjacent aperture 108 into the top passageway of a divided conduit (not shown) attached thereto. A wire 123 may extend across the top of the floor section 101 and out of the fully exposed aperture 109 into a regular undivided conduit (not shown) attached thereto. Still a third wire 124 may be used in the box 90 for attachment to a receptacle or phone jack. The wires issuing from the top passageway of the conduit 52 may also be distributed under the floor section 103 and out of the bottom half sections of the apertures 108 adjacent thereto into bottom passageways of similar divided conduit. A wire such as 125 issuing from the bottom passageway of the conduit 52 passes under the floor section 101 beyond the vertical divider 100 and is available for further distribution through the undivided apertures 109 in the opposite section of the box. Another wire 126 also issuing from the bottom passageway of the conduit 52 may pass over the floor section 103 for feeding into the top passageway of a divided conduit connected to either of the apertures 108 adjacent the floor section 103. A third wire 127 issuing from the bottom passageway of the conduit 52 may be used in the other half section of the box 90 for attachment to a receptacle or phone jack mounted therein.

Figure 25:
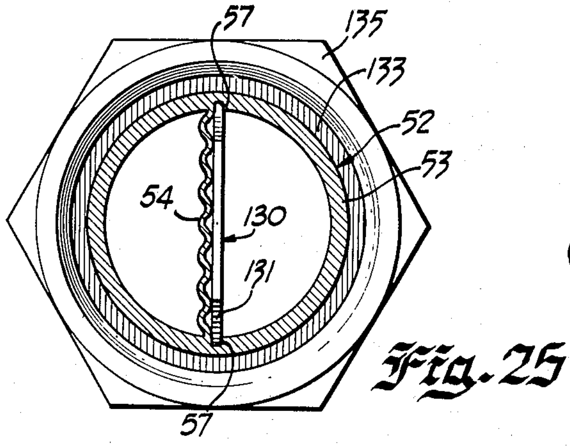
FIG. 25 is a transverse section of the structure of FIG. 24 taken generally along line 25—25 therein.
Figure 26:
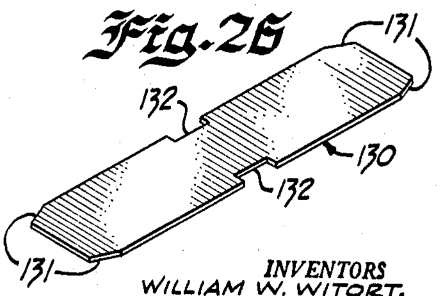
FIG. 26 is a perspective of the coupling insert.

Continuous separation of different types of wiring has been described with regard to conduit, box and conduit-box connector components. It is also necessary to maintain this separation throughout conduit coupling. FIGS. 24–26 deal with conduit coupling and, referring particularly to FIG. 24, the ends of sections of conduits 52—52 are coupled by use of a standard type coupling and the use of a special coupling insert 130. This insert as best illustrated in FIG. 26 constitutes a flat strip of metal or suitable material having beveled corners 131. Approximately midway on opposite side edges of the insert, oppositely positioned indentations or grooves 132 are provided. Referring again to FIG. 24, the insert 130 is received in the conduit ends in the grooves 57 thereof to one side of the partitions 54 and overlying the same. A coupling sleeve 133 is received about the adjacent ends of the conduit sections, the interior of this sleeve being provided with a circumferentially continuous, radially inwardly projecting rib 134 against opposite surfaces of which the ends of the conduit sections abut. The insert 130 is located so that the rib 134 of the coupling sleeve 133 is also received within the opposite grooves 132 thus holding the insert against axial displacement. Locking nuts 135 are threadedly received on opposite ends of the coupling sleeve 133 to permanently fix the connection against disengagement. In this manner the separate wiring services in the divided conduits are maintained completely segregated through the coupling sleeve 133.

The particular inserts 110 and 130 described above are of inexpensive construction and are very readily installed without the exercise of special skills. Standard couplings and connectors may be used throughout the subdivided system and it is necessary merely to run single conduit following standard procedures and using conventional equipment. The box 90 is an existing manufacture which will readily accommodate the special partition 92. It will be recognized that the partition 92 may be rotated 90° in either direction within the box 90 to the extent desired.

The basic principles of the present invention may be applied to any suitable conduit-forming material. Steel rolled and welded, flexible BX, or any suitable sheathing material may be used.

Obviously many modifications of the present invention may be made while still remaining within the scope thereof as defined by the appended claims.

We claim:

1. In combination, a conduit for material delivery, sleeve-like conduit attachment means, and a conduit-attachment means insert, said conduit including internally thereof a partition which sub-divides the same into a plurality of longitudinal passageways, said conduit attachment means being attached to an end of said conduit and constituting an extension thereof, said insert being of plate-like configuration having one end portion thereof received in said conduit in detachable engagement with said partition to constitute an extension of said partition beyond the end of said conduit, said insert further extending through said conduit attachment means to subdivide the same for continuation of said conduit passageways.

2. The combination of claim 1 wherein said conduit includes internal grooving receiving opposite edges of said insert, said grooving being offset to a side of said partition to accommodate said one end portion of said insert in overlying relation with said partition.

3. In combination, a conduit for material delivery, a junction-outlet box, and a conduit-box connection means, said conduit including internally thereof a partition which sub-divides the same into a plurality of longitudinal passageways, said connection means including a sleeve-like member received about said conduit and attached to said box through an opening therein placing said passageways in communication with the interior of said box, said box including a partition member therein having a plate-like portion adjacent said opening extending thereacross in alignment with the partition of said conduit, said connection means further including an insert of plate-like configuration received in said sleeve-like member and extending between the partition of said conduit and the plate-like portion of said partition member.

4. The combination of claim 3 wherein said sleeve-like member is provided with an inwardly directed rib-like means overlying the end of said conduit, said insert having at least one groove-like indentation along a side margin thereof in which said rib-like means is received to prevent axial displacement of said insert.

5. The combination of claim 3 wherein said sleeve-like member is provided with an inwardly directed rib-like means overlying the end of said conduit, said insert having at least one groove-like indentation along a side margin thereof in which said rib-like means is received to prevent axial displacement of said insert, one end portion of said insert extending beyond said indentation being received in said conduit and overlying said partition, said conduit having inner surface grooving receiving said insert, the remaining end portion of said insert extending beyond said indentation being of lesser width than said one end portion to permit close tolerance movement of the rib-like means of said sleeve-like member thereover during mounting of said sleeve-like member on said conduit.

6. In a wire distribution system wherein conduit means is used to deliver different wire services to a junction-outlet box, said conduit means including a longitudinally continuous partition sub-dividing the interior thereof into a pair of separate wire delivery passages, said box including vertical side and end wall portions each formed with spaced conduit means attachment openings, the improvement comprising the provision of a partition means in said box extending between conduit means attachment openings of different vertical wall portions of said box, said partition means including at least one vertical wall section dividing said box into separated wire receiving parts, at least one horizontal wall section extending from said vertical wall section in a plane intercepting the vertical wall portions of said box intermediate the top and bottom margins thereof, at least one edge portion of the horizontal wall section of said partition means bisecting a conduit means attachment opening in a vertical wall portion of said box to maintain divided wire distribution in said box, and means projecting from said one edge portion through said opening into continuity maintaining relation with the partition of said conduit means.

References Cited in the file of this patent

UNITED STATES PATENTS

| | | |
|---|---|---|
| 298,327 | Weston | May 6, 1884 |
| 438,592 | Eckert et al. | Oct. 14, 1890 |
| 1,132,676 | Murray et al. | Mar. 23, 1925 |
| 1,642,142 | Cook | Sept. 13, 1927 |
| 1,759,591 | Pleister et al. | May 20, 1930 |
| 1,775,391 | Fassinger | Sept. 9, 1930 |
| 1,920,811 | Schwabacher | Aug. 1, 1933 |
| 1,930,285 | Robinson | Oct. 10, 1933 |
| 2,073,490 | Lewin | Mar. 9, 1937 |
| 2,550,725 | Schultz | May 1, 1951 |
| 2,916,055 | Brumbach | Dec. 8, 1959 |
| 2,964,586 | Sillman | Dec. 13, 1959 |
| 3,013,690 | Johnson et al. | Dec. 19, 1961 |

FOREIGN PATENTS

| | | |
|---|---|---|
| 22,568 | Great Britain | 1913 |
| 330,182 | Italy | Oct. 7, 1935 |
| 823,864 | Germany | Dec. 6, 1951 |
| 989,945 | France | May 30, 1951 |